United States Patent
Tucker

[11] 3,853,783
[45] Dec. 10, 1974

[54] VANADYL PHTHALOCYANINE SULFONAMIDES AND LASER PROTECTIVE PLASTIC FILTERS CONTAINING THE SAME

[75] Inventor: Robert Jerome Tucker, Hackettstown, N.J.

[73] Assignee: American Cyanamid Company, Stamford, Conn.

[22] Filed: Apr. 9, 1973

[21] Appl. No.: 349,509

Related U.S. Application Data

[62] Division of Ser. No. 165,384, July 22, 1971, abandoned.

[52] U.S. Cl................................ 252/300, 260/314.5
[51] Int. Cl........ F21v 9/00, G02b 5/20, G02c 7/10
[58] Field of Search .......... 260/314.5, 75; 252/300; 351/44

[56] References Cited
UNITED STATES PATENTS

| | | | |
|---|---|---|---|
| 2,155,038 | 4/1938 | Davis et al. | 260/314.5 |
| 2,861,005 | 11/1958 | Siegel | 260/314.5 |
| 3,091,618 | 5/1963 | Fleysher et al. | 260/314.5 |
| 3,148,933 | 9/1964 | Randall et al. | 260/341.5 |
| 3,291,746 | 12/1966 | Donovian et al. | 252/300 |

*Primary Examiner*—Ronald H. Smith
*Assistant Examiner*—J. P. Brammer
*Attorney, Agent, or Firm*—John L. Sullivan

[57] ABSTRACT

Vanadyl phthalocyanine sulfonamides of the formula:

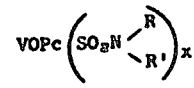

where Pc is a phthalocyanine moiety, R and R' are lower alkyl and x is an integer from 1 to 4; are incorporated into plastics to provide plastic compositions suitable for fabrication into devices, such as goggle lenses, capable of protecting the eye against laser radiation of from about 620 to 720 nanometers, e.g. the ruby laser (694 nm), the krypton laser (671 nm) and the helium-neon laser (633 nm). A typical composition consists of 75 parts poly(methyl methacrylate) syrup, 25 parts methyl methacrylate, 0.03 parts vanadyl phthalocyanine di-n-butylsulfonamide having 2.8 dibutyl sulfonamide radicals per mole of phthalocyanine, 0.2 part 2,2'-dihydroxy-4-methoxybenzophenone and 0.03 part azobisisobutyronitrile. A plate, 0.1 in. thick, cast-molded from said composition, exhibited an optical density at 694.3 nm of 5.5+ and a luminous transmittance of 47 percent. When exposed to a Q-switched ruby laser of 300 kilowatts per cm$^2$ for 20 nanoseconds, the plate remains undamaged.

6 Claims, No Drawings

VANADYL PHTHALOCYANINE SULFONAMIDES AND LASER PROTECTIVE PLASTIC FILTERS CONTAINING THE SAME

This is a continuation, division, of application Ser. No. 165,384 filed July 22, 1971 now abandoned.

This invention relates to new light absorbing compounds and more specifically to new vanadyl phthalocyanine sulfonamides represented by the formula:

where Pc is a phthalocyanine moiety; R and R' are lower alkyl; and $x$ is an integer from 1 to 4.

The invention further relates to plastic compositions containing the vanadyl phthalocyanine sulfonamides as defined above; to optical devices, such as goggle lenses, face shields and the like, fabricated from such compositions; and to the use of such devices for protection of the human eye against the harmful effects of exposure to laser radiation of certain wavelengths, for example the radiation of a ruby laser beam.

Since the discovery of the laser some ten years ago, many useful applications of this unique, powerful form of light have been developed. With such developments, the matter of eye protection for personnel involved in laser work has become extremely important due to the immediate serious damaging effects on the eye of exposure to laser light. For such purpose, it is necessary to provide materials suitable for goggle lenses which will filter or absorb, to a suitable degree, light in the narrow wavelength of the laser and at the same time allow light of visible wavelengths to pass through to a suitable degree. Various devices have been proposed for effective protection of the human eye against the effects of the intense penetrating beam of a laser but generally these include only optical filters made of inorganic substrate materials containing inorganic light absorbers. One such successful device is the "W-37 Anti-Laser Eyeshield" manufactured by Lausch and Lomb. This device, described in Laser Focus Magazine for May, 1969, is characterized by the manufacturer as "Laser protection engineered by laser scientists." Essentially, it is a combination of a dichroic-coated, light reflecting glass plate in combination with a colored, light-absorbing glass plate.

It has now been found that the new vanadyl phthalocyanine sulfonamides of the invention as defined above are useful as the absorbers in plastic laser protective compositions, particularly for those lasers with wavelengths in the region of from about 620 to 720 nanometers which includes the ruby laser (694 nm); the krypton laser (671 nm); and the heliumneon laser (633 nm). The compounds have the required absorption and stability characteristics and in addition have excellent and superior compatibility for incorporation into the types of plastic compositions found most useful for laser protective application. Thus, the compositions containing the absorbers of the invention are not immediately penetrated by the beam of a laser but will withstand direct impingement of the beam for a brief period sufficient to allow the person wearing the lens to withdraw from the area of the beam. Thus, on impingement of a beam of sufficient energy to pierce the lens, the lens will not be pierced immediately, but will first suffer damage observable to the wearer, such as fogging, darkening, waviness or bubbles therein, whereby the wearer will be warned that he is in the danger area. There was no basis on which it could have been expected that the plastic lens containing a compound of the invention would have such "stability," or finite life, under exposure to the laser beam, so as to afford this "warning protection." This discovery that the laser beam could thus be stopped, albeit temporarily, by the plastic lens was, therefore, totally surprising.

Optical filters containing vanadyl phthalocyanine as an infrared absorber have been disclosed by Donoian et al, U.S. Pat. No. 3,291,746. However, Donoian et al were concerned only with protection of the eye against exposure to infrared radiation present in sunlight or emitted from high temperature bodies, such as tungsten filaments, fluorescent lamps, carbon arcs, etc. Ruby or other laser radiation, however, is not infrared radiation in any sense as contemplated by Donoian et al. Thus, laser light, which is a generated, concentrated beam of a specific narrow band of wavelength, is unique and vastly different from all other forms of light. The Donoian et al disclosure of protecting against ordinary infrared radiation from "common sources," such as sunlight, would, therefore, clearly not suggest protecting against the powerful, penetrating beam of the ruby laser.

The vanadyl phthalocyanine sulfonamides of this invention are prepared from vanadyl phthalocyanine by (1) reaction of the latter with chlorosulfonic acid and thionyl chloride to give first the vanadyl phthalocyanine sulfonyl chloride. The acid chloride is then (2) allowed to react with a secondary lower alkyl amine or a mixture of two or more such amines to obtain the desired sulfonamide.

Examples of amines which may be used are dimethylamine, diethylamine, dipropylamine, dibutylamine and mixtures thereof. The reactions involved are represented as follows:

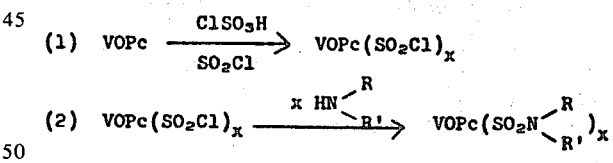

where Pc represents a phthalocyanine moiety, R and R' are lower ($C_1$-$C_4$) alkyl and $x$ is an integer of 1 to 4.

The method of preparing metal phthalocyanine sulfonyl chlorides is conventional, the average number of sulfonyl chloride radicals which are incorporated into the phthalocyanine molecule being controlled by the proportion of phthalocyanine and chlorosulfonic acid employed in the reaction. (See, for example, U.S. Pat. Nos. 2,219,330; 2,897,207 and 3,536,502.) The proportion of secondary amine used in the instant process is sufficient to convert each of the sulfonyl chloride radicals in the vanadyl phthalocyanine sulfonyl chloride to sulfonamide radicals. The preparation of a typical vanadyl phthalocyanine sulfonamide of this invention is shown in detail in Example 1, hereinbelow.

The vanadyl phthalocyanine sulfonamides of the invention have a distinct advantage over the vanadyl phthalocyanines for use in laser-protective compositions and devices since these sulfonamides are readily soluble in various transparent plastics whereas vanadyl phthalocyanine is not. Thus, for protection against the narrow band radiation of the laser beam (as opposed to the broad band radiation encountered in sunlight) the absorber compound must be incorporated in the plastic substrate in a sufficient amount to provide an optical density of at least 3. Since the vanadyl phthalocyanine must be dispersed in the plastic, the attainment of a uniform dispersion providing the required optical density is difficult. Due to the solubility of the sulfonamides, however, this uniform optical density is readily achieved. Thus, the plastic compositions of the invention when formed into lenses provide the necessary laser-protective optical density of at least 3.0 and at the same time a visual transmittance of at least 25 percent.

Useful optical plastics include poly(methyl methacrylate), copolymers of a major proportion of methyl methacrylate, cellulose acetate, cellulose propionate, cellulose acetatebutyrate, polycarbonates, polyvinyl chloride, polysulfones, polystyrene, copolymers of styrene, and the like. The plastics of choice are polymethyl methacrylate, cellulose propionate, polyvinyl chloride and polycarbonates.

The plastic composition of the invention will contain from about 0.001 part to about 1.0 part of the sulfonamide per 100 parts of the plastic, preferably 0.009 to 0.02 parts, with the provision, however, that sufficient is used to give an optical density of at least 3 at the wavelength of the laser. The sulfonamide can be added to the plastic by any of the ways normally used to incorporate additives into plastic, such as dry blending followed by molding, milling, extrusion, or the like, or the compound can be incorporated in the plastic syrup during polymerization.

The compositions and lenses of this invention may also contain other light absorbers, such as ultraviolet absorbers if desired, or conventional additives, such as polymerization initiators, plasticizers, heat stabilizers, anti-static agents, etc.

The invention is illustrated by the following examples.

EXAMPLE 1

A. PREPARATION OF VANADYL PHTHALOCYANINE SULFONYL CHLORIDE

To 230 grams (128.5 ml.) of chlorosulfonic acid there was added 25 grams (0.0432 mole) of vanadyl phthalocyanine over a period of ½ hour at 23°–50°C. The mixture was then heated at 138°–140°C. for 3 hours. After cooling to 60°C., 32.0 grams (19.5 ml.) of thionyl chloride was added drop-wise over a period of 20 minutes. The mixture was then heated to 80°C. with stirring for 2 hours after which it was drowned in a mixture of 700 ml. water, 87 grams of salt and ice to keep the mix at 0°–3°C. After stirring for 15 minutes to insure complete precipitation of the sulfonyl chloride product, the mixture was filtered and the precipitate washed with ice cold water. 255.6 grams of wet filter cake were obtained.

B. PREPARATION OF SULFONAMIDE

To a slurry of 60 grams of wet cake from A (above) in 100 ml. of water and 200 grams of ice, there was added 25.8 g. (0.2 mole) of di-n-butylamine. The mixture was stirred for 10 minutes, and 10 grams sodium bicarbonate and 100 ml. acetone added. After stirring cold for 30 minutes, the mixture was heated to 60°C. and stirred an additional 30 minutes. It was then cooled to room temperature, the vanadyl phthalocyanine sulfonamide precipitating as a tar. The liquid portion was decanted and the remaining tar was washed with water by decantation. The tar was then stirred in dilute hydrochloric acid (excess, about 0.5-1 molar) until it solidified. It was filtered, washed and dried. It was then dissolved in 150 ml. of acetone, filtered to remove insolubles and then evaporated to dryness at 70°C.

The product obtained was shown by assay to have an average of 2.8 dibutylsulfonamide groups per a vanadyl phthalocyanine molecule. As above-indicated, however, the procedure may be adjusted to provide a product having an average of from 1 to 4 sulfonamide groups per vanadyl phthalocyanine molecule.

EXAMPLE 2

A composition consisting of 100 parts of cellulose propionate, 0.07 part of vanadyl phthalocyanine di-n-butylsulfonamide, prepared after the fashion of Example 1, and 0.2 part of 2,2′-dihydroxy-4-methoxybenzophenone was blended and molded into a laser protective spectacle having a thickness of 0.093 inch. It had the following properties:

| Optical density (O.D.) | at 694.3 nm | = 10.0 (Ruby laser) |
|---|---|---|
| | at 671.0 nm | = 6.6 (Krypton laser) |
| | at 633.0 nm | = 3.4 (Helium-Neon laser) |
| % Luminous transmittance | | = 29 |

When the concentration of the sulfonamide compound was increased to 0.08 part, the spectical obtained had an optical density at 633 nm of 3.5 and a transmittance of 25 percent.

EXAMPLE 3

A mixture was prepared consisting of 75 grams of poly(methyl methacrylate) syrup, 25 grams of methyl methacrylate, 0.03 gram of azobisisobutyronitrile, 0.2 gram 2,2′-dihydroxy-4-methoxybenzophenone, and 0.03 gram of vanadyl phthalocyanine di-n-butylsulfonamide prepared as described in Example 1. The mixture was deaerated with a $N_2$ purge, degassed under vacuum, poured into a casting mold and cured overnight at 60°C. The sample was postcured at 100°C. for one hour. A plate (0.1 inch thick) was obtained having the following properties:

O.D. at 694.3 nm = 5.5+
at 671 nm = 4.2
% Luminous transmittance = 47

When this plate was directly exposed to a Q-switched ruby laser of 300 kilowatts per $cm^2$ for 20 nanoseconds, no damage to the plate resulted.

EXAMPLE 4

A mixture was prepared consisting of 75 grams of polymethyl methacrylate syrup, 25 grams of methyl methacrylate, 0.03 gram of azobisisobutyronitrile, 0.2 gram of 2,2'-dihydroxy-4-methoxybenzophenone, 0.02 gram of octadecyl 4-hydroxy-3,5-ditert.butylphenyl propionic acid and 0.012 gram of vanadyl phthalocyanine di-n-butyl-sulfonamide prepared after the fashion of Example 1. The mixture was deaerated with $N_2$ purge, degassed under vacuum, poured into a casting mold and cured overnight at 60°C. The sample was post-cured at 100°C. for one hour. A plate (0.1 inch thick) was obtained having the following properties:

O.D. at 694.3 nm = 3.4
% Luminous transmittance = 62

Using the same composition as above except for the use of 0.015 gram of the vanadyl phthalocyanine di-n-butylsulfonamide, a plate having the following properties was obtained:

O.D. at 694.3 nm = 3.9
% Luminous transmittance = 58

I claim:

1. An optical filter comprising a thermoplastic polymer substantially transparent to visable light having incorporated therein from 0.001 to 1.0 percent, by weight, of a vanadyl phthalocyanine sulfonamide having the formula:

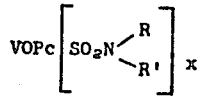

wherein Pc is the phthalocyanine moiety; R and R' are lower alkyl and $x$ is an integer from 1 to 4; said filter having an optical density of at least 3.

2. An optical filter according to claim 1 wherein the vanadyl phthalocyanine sulfonamide is a di-n-butyl sulfonamide.

3. An optical filter according to claim 1 wherein the thermoplastic polymer is selected from the group consisting of cellulose propionate, poly(methyl methacrylate), polyvinyl chloride and polycarbonates.

4. A method of protecting the human eye from exposure to laser radiation having a wavelength of from about 620 to about 720 nanometers which comprises interposing between the source of said radiation and the eye an optical filter comprising a thermoplastic polymer substantially transparent to visible light having incorporated therein from 0.001 to 1.0 percent, by weight, of a vanadyl phthalocyanine sulfonamide having the formula:

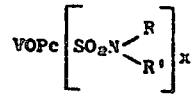

wherein Pc is the phthalocyanine moiety; R and R' are lower alkyl and $x$ is an integer from 1 to 4; said filter having an optical density of at least 3.

5. A method according to claim 4 wherein the vanadyl phthalocyanine sulfonamide is a di-n-butyl sulfonamide.

6. A method according to claim 4 wherein the thermoplastic polymer is selected from the group consisting of cellulose propionate, poly(methyl methacrylate), polyvinyl chloride and polycarbonates.

* * * * *